Jan. 9, 1945.　　　　　J. A. EBELING　　　　　2,366,772
AUTOMATIC POSITION LOCATOR
Filed Dec. 11, 1943　　　3 Sheets—Sheet 1

WITNESS:
Robt R Mitchel

INVENTOR
James A. Ebeling
BY Augustus B. Stoughton
ATTORNEY.

Jan. 9, 1945. J. A. EBELING 2,366,772
AUTOMATIC POSITION LOCATOR
Filed Dec. 11, 1943 3 Sheets-Sheet 2
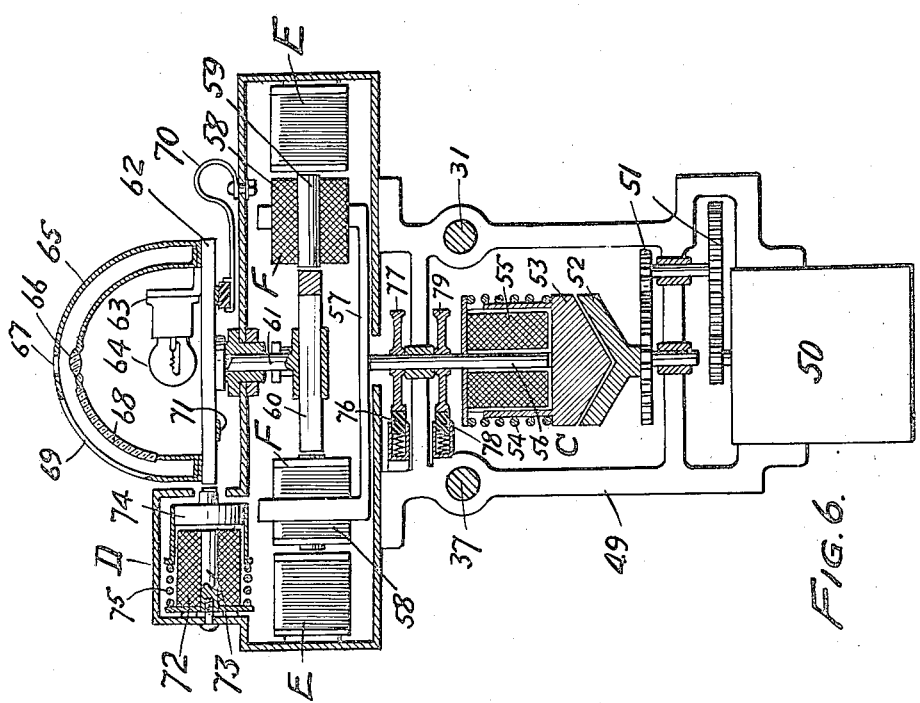
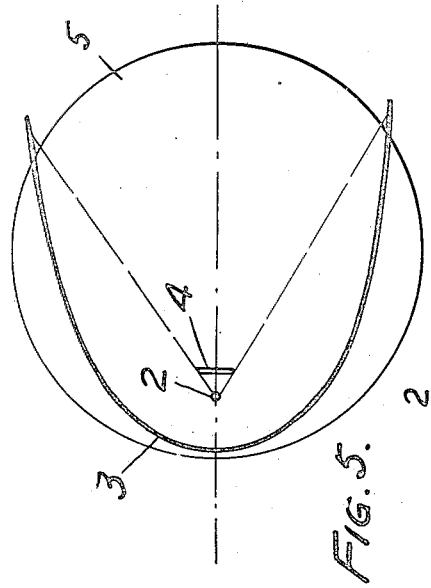
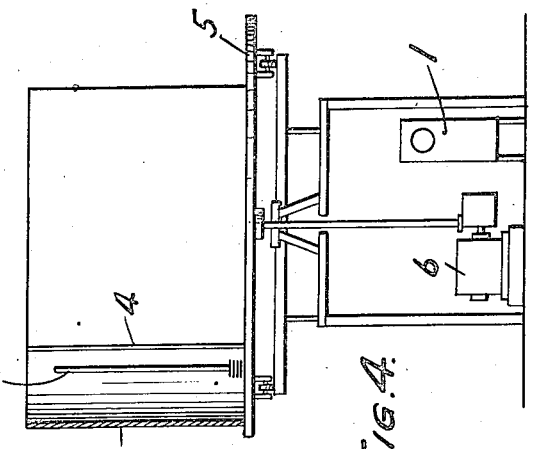
INVENTOR
James A. Ebeling
BY
Augustus B. Stoughton
ATTORNEY.
WITNESS:
Robt. R. Mitchel.

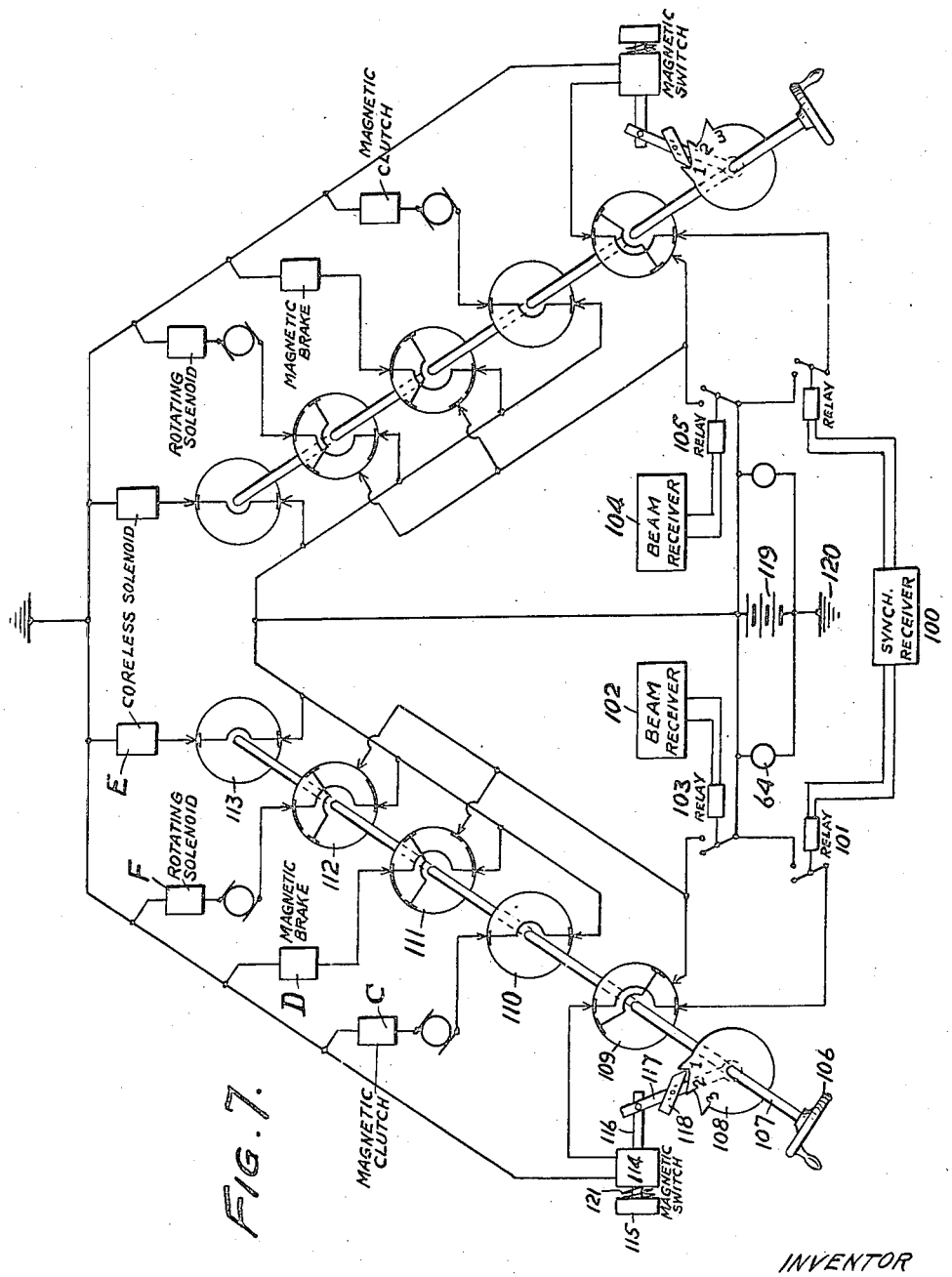

Patented Jan. 9, 1945

2,366,772

UNITED STATES PATENT OFFICE 2,366,772

AUTOMATIC POSITION LOCATOR

James A. Ebeling, Kenova, W. Va.

Application December 11, 1943, Serial No. 513,966

7 Claims. (Cl. 250—11)

The object of my invention is to provide an apparatus which gives a continuous and automatic indication of the geographic position of a vehicle, such as an aircraft or ship, on a map carried on board the aircraft or ship.

In general, my device consists of two rotating, directional, short-wave, radio transmitters mounted on the surface of the earth or sea. These transmitters revolve in synchronism and cross their respective meridians simultaneously. On board the vehicle is a map adjacent which are mounted two devices arranged to indicate lines on the map, so that the intersection of these lines represents the position of the vehicle on the map. These means may conveniently consist of lights each of which casts a beam across the map. These lights are mounted so that the beams are rotatable relative to the map but are normally held against such rotation. An armature is attached to each of the lights. In magnetic relation to the armature, there is provided a pair of rotating solenoids mounted for rotation synchronously with the beams of the radio transmitters by means of a constant speed motor through a magnetic clutch. A magnetic brake, interconnected with the magnetic clutch and with the rotating solenoids, normally holds the light against rotation. The vehicle carries a pair of radio-receivers each of which is responsive to the signals of one of the transmitters. These receivers are connected to the rotating solenoids preferably through a relay. There may also be provided synchronizing means for insuring that the rotating solenoids are rotating synchronously with and parallel to the beams of the radio transmitters. This synchronizing mechanism may consist of a third radio transmitter which may be non-directional, a third radio-receiver carried by the vehicle and responsive to signals from any of the other receivers, and a plurality of pairs of solenoids preferably coreless and located in pairs in magnetic relation to the pairs of rotating solenoids so that, when the coreless solenoids are energized due to a signal being received by the third receiver, the rotating solenoids, which are also energized, are drawn into alignment wtih the coreless solenoids and thus are properly located in zero position. The electrical connections between the radio-receivers and the solenoid, and the magnetic brake and the magnetic clutch, may be controlled by a controller which may be manually operated but which may be conveniently provided with a magnetic switch and mechanism controlled by said magnetic switch for automatically rotating the controller.

The operating principle of my device is that if the instant that one of the beams of the directional radio transmitters crosses the meridian be known to an observer on the vehicle, and the speed of rotation of the beam also be known, then it is apparent that the lapse of time between the beam crossing its meridian and the reception of the beam signal by the vehicle will give an indication of the direction of the vehicle from the beam signal station. Knowing the vehicle's direction from two such beam signal stations will fix the location of the vehicle according to well known surveying principles.

For a further exposition of my invention, reference may be had to the annexed drawings and specification, at the end thereof my invention will be specifically pointed out and claimed.

In the drawings:

Fig. 4 is a side elevation, broken in vertical cross-section, of the transmitting part of my device;

Fig. 5 is a top plan view of Fig. 4;

Fig. 6 is a side elevation, with parts in vertical cross-section, of the device for indicating a line on the map and its associated parts; and Fig. 7 is a diagram showing the parts of my device.

Figure 1:
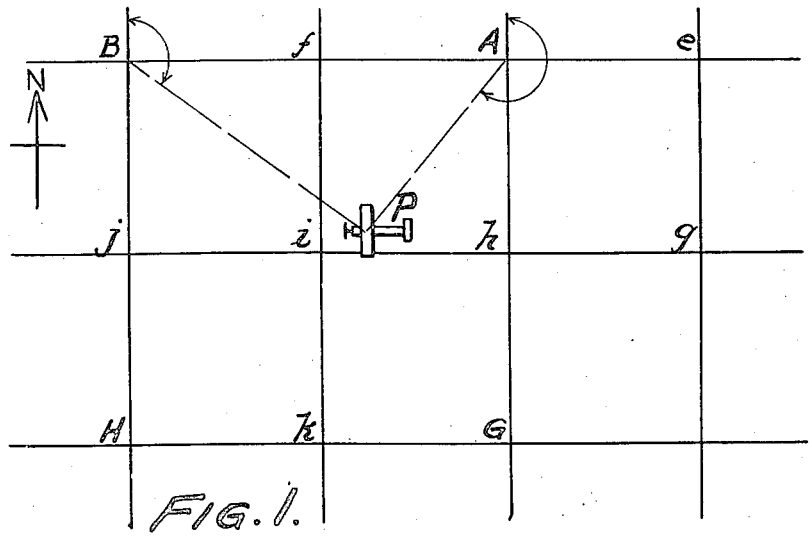
Fig. 1 is a diagram explanatory of my device.

That preferred embodiment of my invention selected from among others for illustration in the drawings and description in the specification is as follows:

1. *The device in general.*—It is important that all the beams rotate in synchronism. It is therefore necessary to correct their intervals from time to time from one central station which may conveniently be a non-directional transmitter which may operate on any desired wave-length and which may be located, for example, at A or B in Fig. 1, or at some other location. This synchronizing station would also serve as a check on the synchronism of the position locator on the vehicle.

It is proposed that the entire country, and principal sea lanes, be laid out on a grid system, although other arrangements could also be used. In the grid system, the rotating beam stations A, B, G, H, will be located at the principal grid intersections, with the points e, f, g, h, i, j, k as secondary intersections. Accordingly, maps will be issued including each adjacent pair of stations and the secondary intersections to either side so that, no matter what course a plane or ship may be following, the most convenient choice of maps and radio beacons will be available. The grid will be laid out with the axes running N—S and E—W.

As shown in Fig. 1, the plane P is in the zone AB*jh* and is headed west. In this case, the pilot would have his receivers tuned to radio beacons A and B and would use the map covering the zone AB*jh*. If the plane were at the same position and traveling in a general N—S direction, the pilot would tune in radio beacons A and G and would use the map covering zone A*fk*G. The most feasible distance between the beacons will be determined by experiment.

2. *Transmitters.*—Figs. 4 and 5 show one of the proposed rotating, directional, ultra-short-wave, radio beacons. The transmitter 1 has its own identifying frequency and operates continuously. The output of the transmitter is conducted to the revolving directional antenna 2 which consists of a vertical metal rod at the focal points of a parabolic sheet-metal reflector 3. This throws out a narrow radio beam suitable for the purpose; and, to further narrow the beam and diminish dispersion, a grounded metal shield 4 is placed in such a manner as to cut off from transmission to the other all the waves not reflected from the reflector. As previously stated, all the radio beacons of the system rotate at the same speed and all have their "zero" positions to the geographic North, which they cross simultaneously. The antenna rod 2, parabolic reflector 3, and the grounded shield 4, are mounted on a turntable 5 which is caused to rotate by a constant speed motor 6.

Figure 2:
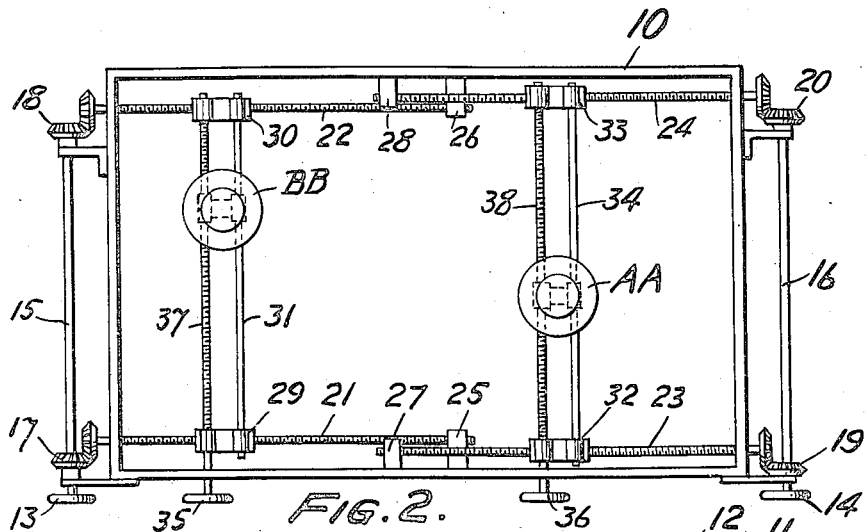
Fig. 2 is a top plan view, with parts removed, of the receiving part of my device.
Figure 3:
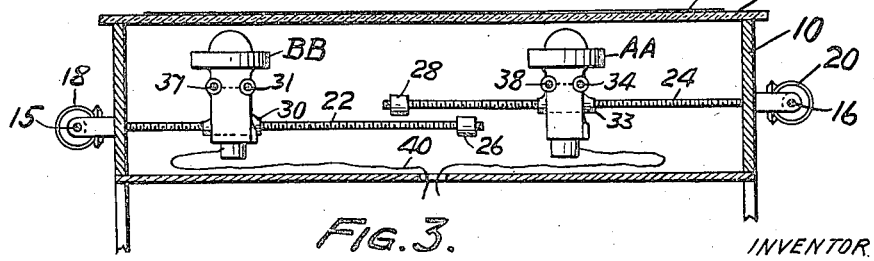
Fig. 3 is a vertical cross-section of the parts shown in Fig. 2.

3. *Map and associated parts.*—As is seen in Figs. 2 and 3, the vehicle carries a frame or stand 10 having a transparent or translucent top 11, as of glass, on which may be mounted one of the maps 12 of the grid system described above and which is similar to the diagram shown in Fig. 1. Handles 13 and 14 turn rods 15 and 16 and, by means of gearing 17—18 and 19—20, turn screws 21—22 mounted in bearings 25—26 and screws 23—24 mounted in bearings 27—28 These screws move carriages 29—30 and 32—33 which are connected by rods 31 and 34, respectively, and which support the directionalizing apparatus AA, BB shown in detail in Fig. 6 and which will be presently described. Handles 35 and 36 operate screws 37 and 38, respectively, so that, by proper manipulation of the handles, the units AA and BB may be located under any desired portion of the map 12. Wires 49 conduct current to the units AA and BB.

4. *Directionalizing apparatus.*—The units AA and BB are duplicates and BB is illustrated in Fig. 6 and consists of a frame 49 carrying a constant speed motor 50 which operates through gearing 51 a magnetic clutch generally indicated at C and consisting of a clutch-driving member 52, a clutch-driven member 53, a spring 54, a coil 55, and a shaft 56. Shaft 56 carries a yoke 57 on which are mounted a pair of rotating solenoids generally indicated at F and consisting of a pair of coils 58 and a pair of cores 59. Solenoids F should be mounted for synchronous rotation with the beams of the directional transmitters and for constant rotation relative to map 12. In other words, rotating solenoids F should not vary their positions relative to map 12 but should rotate at a constant rate in respect thereto. An armature 60 is mounted on the casing for rotation by means of shaft 61 which carries a base 62 on which is mounted a bracket 63 for a lamp 64 enclosed in housing 65 carrying a simple condensing lens 66 opposite a hole 67 and a curved lens 68 opposite a slot 69 which serves to transmit a narrow beam or slice of light onto the map 12. Spring 70 conducts current to lamp 64 by means of contact 71 on base 62. The magnetic brake is generally indicated at D and consists of a coil 72 having a core 73 and an armature 74 which is stressed by spring 75 into contact with base 62 so as to hold light 64 against rotation when coil 72 is not energized. A pair of synchronizing solenoids are indicated at E and located in magnetic relation for rotating solenoids F. Solenoids E may be coreless.

5. *Receiving apparatus.*—Fig. 7 shows a synchronous receiver 100 responsive to the signals of the synchronizing transmitter and connected preferably by means of relays 101 to one of the contacts of one of the controllers now described. These controllers consist of a handle 106 connected to a shaft 107 on which is mounted a ratchet 108 and controller disks 109—110—111—112—113. Disks 110, 111, 112, 113 are connected to the magnetic clutch C, the magnetic brake D, the rotating solenoids F, and the coreless solenoids E, respectively. Disk 109 is connected to coil 114 of a magnetic switch having an armature 115 and a spring 121 stressing the armature away from the core. A mechanism operated by the magnetic switch is provided for rotating the controller and consists of a core 116 pivotally connected to a lever 117 rotatably mounted on shaft 107 and bearing a pawl 118 which co-operates with ratchet 108. Any other type of motor for rotating the controller may be used if desired. Beam-receivers 102, 104 are mounted on the vehicle and are each responsive to the signals of one of the directional transmitters and may be connected to relays 103, 105, respectively. Lamps 64, which form parts of the directionalizing units AA and BB, are connected across the battery 119 which is connected to the ground at 120.

6. *Operation.*—The pilot or navigator of the vehicle selects a suitable map for the grid section desired. He then sets the directionalizing units AA and BB so that the light thrown through lenses 66 and holes 67 falls on the map at the location represented by the location of the beam transmitters A and B on the earth's surface. The points of light serve admirably for this purpose. The controllers 106 are then placed in position 1 in which they are shown in Fig. 7. The magnetic switches 114 are thus connected so that, upon the reception of a signal from the synchronizing transmitter by the synchronizing receiver 100, the relays 101 are operated and current is transmitted to magnetic switches 114, to magnetic clutches C, and to coreless solenoids E. The magnetic switches cause the controllers 106 to turn into position 2 by means of mechanisms 114—118. Clutches C and solenoids E as well as rotating solenoids F and magnetic brake D being all simultaneously energized, light 64 and rotating solenoids F are free for rotation, and rotating solenoids F and armature 60 and consequently the beams from lights 64 are drawn into alignment with the synchronizing solenoids E and consequently into proper "zero" position. In position 2 of controllers 106, magnetic switches 114 are disconnected from synchronous receiver 100 and are connected to beam receivers 102 and 104 while magnetic clutches C and synchronizing solenoids E are de-energized, consequently freeing rotating solenoids F for rotation by constant speed motor 50. Upon the reception of a signal by either receiver 102 or 104, the corresponding magnetic switch is energized and rotates the corresponding controller 106 into position 3, which is the normal operating position. In this position, the magnetic switches 114 are disconnected from either the synchronizing receiver 100 or the beam-receivers 102 and 104. The magnetic brakes D and the rotating solenoids F, however, are located so that, upon the reception of a signal by the beam-receiver 102 or 104, the magnetic brakes D are energized, thereby freeing the lights 64 for rotation and, at the same time, the rotating solenoids F are momentarily energized, thus drawing the armature 60 into alignment with these solenoids and hence rotating the beam of light from the light 64 into a position corresponding to the line formed by the beam from the directional transmitter. The energization of magnetic brakes D and rotating solenoids F is only instantaneous during the short period of time the beam from the directional transmitter sweeps the vehicle, so that the rotating solenoids F are quickly de-energized and only move armature 60 a small amount, while magnetic brakes D are also de-energized and hold the beam of light from light 60 into the position to which it has been turned.

It will be obvious to those skilled in the art to which the invention relates that modifications may be made in details of construction and arrangement without departing from the spirit of the invention which is not limited as to such matters or as to matters of mere form.

I claim:

1. A receiving system for an automatic position locator comprising, a map, a plurality of lights each having provisions for shedding a beam of light across said map and rotatable relative thereto, a plurality of armatures each attached to one of said lights, a plurality of rotating solenoids arranged in pairs, each pair in magnetic relation to one of said armatures and arranged to align said armature with said pair because of the energization of said pair of rotating solenoids, a synchronizing radio-receiver, a plurality of radio-receivers each responsive to a different signal than any other of said receivers, a plurality of magnetic brakes each co-operating with one of said lights to control the rotation of said light, a plurality of magnetic clutches each attached to one of said pairs of rotating solenoids to control the rotation of said pair, a plurality of synchronizing solenoids arranged in pairs, each pair in magnetic relation to said pairs of said rotating solenoids, a source of electricity, and a plurality of controllers each controlling an electric connection under the control of one of said second-mentioned receivers, said connection extending between said source of electricity and one pair of said rotating solenoids and one of said magnetic brakes, said controllers also each controlling an electric connection under the control of said synchronizing receiver, said connection extending from said source of electricity to one pair of said synchronizing solenoids and to one pair of said rotating solenoids and to one of said magnetic brakes and to one of said magnetic clutches.

2. A receiving system for an automatic position locator comprising, a map, a plurality of lights each having provisions for shedding a beam of light across said map and rotatable relative thereto, a plurality of armatures each attached to one of said lights, a plurality of rotating solenoids arranged in pairs, each pair in magnetic relation to one of said armatures and arranged to align said armature with said pair because of the energization of said pair of rotating solenoids, a synchronizing radio-receiver, a plurality of radio-receivers each responsive to a different signal than any of said other receivers, a plurality of magnetic brakes each co-operating with one of said lights to control the rotation of said light, a plurality of magnetic clutches each attached to one of said pairs of rotating solenoids to control the rotation of said pair, a plurality of synchronizing solenoids arranged in pairs in magnetic relation to said pairs, each pair of rotating solenoids, a source of electricity, a plurality of controllers controlling an electric connection under the control of one of said radio-receivers, said connection extending between said source of electricity and one pair of said rotating solenoids and one of said magnetic brakes, said controllers each controlling an electric connection under the control of said synchronizing radio-receiver, said connection extending between said source of electricity and one pair of said synchronizing solenoids and one pair of said rotating solenoids and one of said magnetic brakes and one of said magnetic clutches, a plurality of magnetic switches connected by said controllers to said source of electricity under the control of said synchronous radio-receiver or under the control of one of said radio-receivers, and mechanisms each operated by one of said magnetic switches because of energization of said switch so as to rotate one of said controllers.

3. In a navigating apparatus for a movable body, a chart mounted on said body and fixed with respect thereto, a plurality of means for receiving electro-magnetic waves transmitted from distant stations, a plurality of means co-operating together for indicating on said chart the position of said movable body, a plurality of movable electrical means each controlled by one of said receiving means for actuating said indicating means, a plurality of constant speed motors, a plurality of electro-magnetic clutches each connected to one of said motors and under the control of one of said means for receiving electro-magnetic waves to connect and disconnect one of said electrical means to one of said motors for rotating said electrical means relative to said chart, and synchronizing means for receiving electro-magnetic waves transmitted from a distant station and operable in response to said waves to start said electrical means in synchronism with each other.

4. An automatic position locator for vehicles such as air-craft or ships comprising, a plurality of radio transmitters each arranged to transmit a different signal in a beam rotating synchronously with respect to the other in a horizontal plane and crossing the same line at the same instant in the same direction, a synchronizing radio transmitter having a different signal from either of said transmitters, a map carried by said vehicle, a plurality of first means each arranged to indicate a line on said map passing through a location corresponding to one of said beam transmitters, a plurality of second means mounted for rotation synchronously with said beam transmitters, a plurality of radio-receivers carried by said vehicle and each responsive to the signal of one of said beam transmitters and each having an output circuit including one of said second means whereby one of said beam transmitters energizes one of said radio-receivers and said radio-receiver energizes one of said second means and causes said second means to move one of said first means and the line indicated on the map by said first means into a position on said map corresponding to the position of the beam from said radio transmitter, a synchronizing radio-receiver responsive to the signals of said synchronizing transmitter, and additional means connected to said synchronizing receiver and arranged when energized to locate said first means in synchronism with said beam.

5. A receiving system for an automatic position indicator comprising, a map, a plurality of continuously illuminated lights having provision whereby each sheds a beam of light across said map and rotatable relative to said map, a plurality of rotating solenoids arranged in pairs, a plurality of radio-receivers having non-rotating antenna to receive different signals and each having an output circuit including one of said pairs of rotating solenoids, a plurality of armatures each attached to one of said lights and located in magnetic relation to one of said pairs of rotating solenoids whereby one of said receivers energizes one of said pairs of rotating solenoids and said pair of rotating solenoids attracts one of said armatures into alignment therewith, and a plurality of magnetic brakes each having braking engagement with one of said lights and electrically interconnected with one of said pairs of rotating solenoids whereby one of said brakes and one of said pairs of rotating solenoids are energized and thereby release said light for rotation.

6. A receiving system for an automatic position locator comprising, a map, a plurality of lights having provisions whereby each sheds a beam of light across said map and rotatable relative to said map, a plurality of rotating solenoids arranged in pairs, a plurality of radio-receivers arranged to receive different signals and each having an output circuit including one of said pairs of rotating solenoids, a plurality of armatures each attached to one of said lights and located in magnetic relation to one of said pairs of said rotating solenoids whereby one of said receivers energizes one of said pairs of rotating solenoids and said pair of rotating solenoids aligns one of said armatures with said pair of rotating solenoids, a synchronizing radio-receiver responsive to different signals than any of said receivers, and a plurality of pairs of synchronizing solenoids arranged in pairs in magnetic relation to the said pairs of rotating solenoids whereby said synchronizing receiver in response to a signal received by it energizes said pairs of synchronizing solenoids and said pairs of synchronizing solenoids attract said pairs of rotating solenoids into alignment therewith.

7. A receiving system for an automatic position locator comprising, a map, a plurality of lights having provisions whereby each sheds a beam of light across said map and rotatable relative to said map, a plurality of rotating solenoids arranged in pairs, a plurality of radio-receivers arranged to receive different signals and each having an output circuit including one of said pairs of rotating solenoids, a plurality of armatures each attached to one of said lights and located in magnetic relation to one of said pairs of rotating solenoids whereby said receivers upon the reception of a signal energizes one of said pairs of said rotating solenoids and thereby attracts one of said armatures into alignment with said pair of rotating solenoids, a synchronizing radio-receiver responsive to different signals than any of said receivers, a plurality of pairs of synchronizing solenoids arranged in pairs in magnetic relation to said pairs of rotating solenoids whereby said synchronizing radio-receiver upon the reception of a signal energizes said pairs of synchronizing solenoids and thereby attracts said pairs of rotating solenoids into alignment with said pairs of synchronizing solenoids, a pair of constant speed motors, and a plurality of magnetic clutches each attached to one of said motors and adapted to connect and disconnect one of said pairs of rotating solenoids to one of said motors because of the energization of said magnetic clutch which is interconnected with one of said synchronizing solenoids.

JAMES A. EBELING.